US006232436B1

United States Patent
Beck et al.

(10) Patent No.: US 6,232,436 B1
(45) Date of Patent: May 15, 2001

(54) PROCESS FOR MAKING-UP POLYAMIDE RESINS SOLID AT ROOM TEMPERATURE

(75) Inventors: Wilhelm Beck, Duesseldorf; Bernhard Leibmann, Hilden; Aike Niemann, Monheim, all of (DE); John D. Snyder, Ashkum, IL (US); Kenneth Bicknell, Bourbonnais, IL (US); Michael Mahler, Crete, IL (US)

(73) Assignee: Cognis Deutschland GmbH, Dusseldorf (DE)

( * ) Notice: Subject to any disclaimer, the term of this patent is extended or adjusted under 35 U.S.C. 154(b) by 0 days.

(21) Appl. No.: 09/396,906

(22) Filed: Sep. 15, 1999

(51) Int. Cl.$^7$ .................. C08F 6/00; C08J 3/00; C08J 3/12
(52) U.S. Cl. ............ 528/502 F; 528/480; 528/499; 528/502 R; 528/502 A; 528/503
(58) Field of Search .................. 528/502 R, 502 F, 528/480, 499, 502 A, 503; 425/67

(56) References Cited

U.S. PATENT DOCUMENTS

| 4,728,276 | * | 3/1988 | Pauley et al. ............... 425/67 |
| 4,757,131 | * | 7/1988 | Bongers et al. ............... 528/335 |
| 4,760,129 | * | 7/1988 | Haering et al. ............... 528/481 |
| 5,049,651 | * | 9/1991 | Heinz et al. ............... 528/480 |
| 5,596,070 | * | 1/1997 | Gotz ............... 528/502 R |

FOREIGN PATENT DOCUMENTS

3702841A1 * 8/1987 (DE) .

* cited by examiner

Primary Examiner—P. Hampton-Hightower
(74) Attorney, Agent, or Firm—John E. Drach; Glenn E. J. Murphy; Steven J. Trzaska

(57) ABSTRACT

A process for granulating a polyamide resin involving: (a) providing an underwater granulating device having a heated multiple-bore die wherein the bores have an internal diameter ranging from 1.2 to 2.5 mm and a length of from 12 to 50 mm; (b) providing a polyamide resin melt having a viscosity, at 160° C., of less than 3,000 mPas; (c) cooling the polyamide resin melt to form a cooled polyamide resin; (d) introducing the cooled polyamide resin into and through the heated multiple-bore die to form an extrudate; (e) providing a source of water; (f) contacting the extrudate with the water to form a cooled extrudate; and (g) cutting the cooled extrudate into granules.

12 Claims, No Drawings

PROCESS FOR MAKING-UP POLYAMIDE RESINS SOLID AT ROOM TEMPERATURE

BACKGROUND OF THE INVENTION

This invention relates to a process for making-up polyamide resins which are solid at room temperature and which have a viscosity at 160° C. of less than 3,000 mPas, a melt of the polyamide resins being cooled and cut into individual pieces.

All the viscosities mentioned in the present specification were measured by the Brookfield method.

Although polyamide resins belong to the large group of polycondensation products, they cannot be compared with high molecular weight linear polyamides. In contrast to those polyamides, polyamide resins include not only solid compounds, but also liquid compounds and have a relatively low molecular weight of up to about 10,000.

The basic types of polyamide resins are condensation products of dimeric fatty acid and ethylenediamine. They are brittle to tough, light to beige-colored products which melt at temperatures of 80° to 250° C. and have low melt viscosities.

Polyamide resins are used as hotmelt adhesives, printing ink binders and thixotropicizing agents. Within the context of the present invention, polyamide resins suitable as printing ink binders, which have relatively low viscosities at 160° C., are of particular significance.

Printing inks for non-absorbent substrates, such as plastic films and aluminium foils, are produced from polyamide resins such as these. The resins also show excellent adhesion to Cellophane and pretreated polyolefins. They are divided into alcohol/cosolvent- and alcohol-soluble types and are used in flexographic and gravure printing. Blending with other binders provides them with certain application-specific properties. Their favorable flex, scratch and scrub resistance and the high gloss of the resulting films are particularly worth mentioning. The resins may be dissolved—according to type—in alcohol/aliphatic hydrocarbon mixtures or alcohol/aromatic hydrocarbon mixtures or in pure alcohols. Additions of esters or ketones can influence the evaporation properties of the printing inks.

The production of low-viscosity polyamide resins is generally carried out in batches by polycondensation of primary and secondary amines with dimer fatty acids. The hot melt obtained (temperature ca. 200° to 300° C.) has to be subsequently cooled and solidified (made up).

Various processes may be used for this purposes, depending on the type and viscosity of the polaymide resin:

Thus, underwater granulation is normally used for high-viscosity polyamide resins which are employed, for example, in hotmelt adhesives. This process and the corresponding machines are described, for example, in DE 37 02 841 C2 although the thermoplastics to be processed are not mentioned. The lower viscosity limit for the melt in this case is normally about 3,000 mPas (at 160° C.). The softening point of the solid polyamide resins is in the range from about 110° to 150° C.

Pelletizing belts or pelletizing plates are generally used for the low-viscosity polyamide resins which are used to make printing inks. However, pelletizing belts/plates are confined to low viscosities. The viscosity range in their case is from 100 to about 3,000 mPas (temperature of the melt 130° to 160° C., softening point about 110° C.).

The relatively old dicer technology is still occasionally used (for low to high viscosities). In this case, a ribbon is cast from the melt, cooled on a cooling belt and then cut longitudinally and transversely by the dicer. However, this technology is attended by disadvantages, such as low throughput and high energy consumption, dust and noise.

In some cases, strand granulation is also used. The machine used consists of a cooling belt similar to the pelletizing belt onto which the melt is cast in narrow, 4 to 8 mm wide strips. The spaghetti-like strands are then cooled and thus solidified. A following cutter cylinder cuts the strands into 2 to 8 mm long pieces.

In the known underwater granulation of thermoplastics, the plastic to be melted is passed through an extruder or a melt pump to a heated multiple-bore die where ti is pressed through bores arranged in a circle. A stream of water flows past the outlet side of the die. Rotating blades arranged on this side of the die cut the strands issuing from the die and partly hardened by the stream of water. The plastic granules are transported by the stream of water to a pre-drainage stage where most of the water is removed from the granules. The remaining water is then removed from the granules in a dryer. An underwater granulator suitable for this known process is described in the above-cited DE 37 02 841 C2 (Gala Industries, Inc.).

The known underwater granulation technique cannot readily be used for making up the above-mentioned polyamide resins suitable for use as printing ink binders. This is because the polyamide resins usable for underwater granulation have to have a relatively broad temperature range in which they have a viscosity of more than 3,000 mPas, but are still not so viscous that they actually solidify in the bores of the die which normally have an internal cross-section of around 3 mm. The viscosity mentioned is necessary to ensure that the strands issuing from the multiple-bore die of the underwater granulator have a sufficient consistency to be able to be cut into individual granules by the rotating blade immediately adjacent the die.

However, the viscosity of the above-mentioned low-viscosity polyamide resins usable for printing inks decreases relatively quickly with increasing temperature so that only a very narrow temperature range suitable for underwater granulation exists. If the temperature is too high, a strand which hardens as it issues from the die so that it can be cut by the blade cannot be formed; instead, the product flows uncontrollably into filaments in the stream of cooling water. Filaments and/or lumps are formed. If, by contrast, the strand is heavily precooled in order sufficiently to increase the viscosity, the product is in danger of partly solidifying in some of the outlet bores of the multiple-bore die. Since the gear pumps or extruders used to transport the melt are capable of generating a constant volumetric flow rate largely irrespective of the pressure, the blockage of some of the outlet bores results in an uncontrollable increase in throughput of product from the other bores of the die. This in turn prevents controlled drop formation and hardening of the product in the stream of cold water, resulting in the formation of filaments or tangles and lumps. A reduction in the output of the pump or the extruder only leads to further blockage of the bores. An interruption in production is unavoidable.

Accordingly, the problem addressed by the present invention was to make up low-viscosity polyamide resins by the process mentioned at the beginning using an only slightly modified machine which could also be used for making-up high-viscosity polyamide resins.

BRIEF SUMMARY OF THE INVENTION

According to the invention, the solution to this problem in the process mentioned at the beginning is characterized in that the polyamide resins are subjected to underwater granulation, the polyamide resins being forced through a heated multiple-bore die of which the bores—for a given length—have such a narrow cross-section that the strands of polyamide resin can be cut immediately after leaving the bores.

DETAILED DESCRIPTION OF THE INVENTION

The choice of a particularly narrow bore cross-section in combination with precisely defined length of the bores (die bores) is crucial to the invention. The uniformly high pressure loss thus obtained over all the bores (outlet bores) guarantees a controlled volumetric flow rate that is constant over all the bores. In addition, the temperatures of the melt can thus be selected very close to the solidification point or even below the solidification point (supercooling). These temperatures provide for sufficiently rapid solidification and hence for sufficiently high cuttability of the strands on leaving the multiple-bore die and hence on entering the stream of cold water. To carry out the process, an existing underwater granulating machine designed for high-viscosity polyamide resins need only be slightly modified. To this end, the cross-section of the bores in the multiple-bore die can be correspondingly reduced by additional inserts. In this way, the same machine can be used to make up both high-viscosity and low-viscosity polyamide resins.

In addition, the heating of the multiple-bore die ensures that the bores are not blocked by premature solidification of the polyamide resins through heat losses from the multiple-bore die in the stream of cold water.

In one particularly advantageous embodiment, the melt is cooled or (with certain polyamide resins) even supercooled to just above its solidification point, more particularly to 5° to 10° C. above that point, before it is forced through the bores. Reheating then occurs within the multiple-bore die.

Since the melt has a temperature just above its solidification point before entering the multiple-bore die, individual solidified lumps may well be formed. In order to retain these solidified particles, it is of advantage to filter the melt after cooling before it is forced through the bores.

The process according to the invention is particularly suitable for polyamide resins with a molecular weight of 2,000 to 10,000.

In another embodiment of the invention, the temperature of the melt immediately before it enters the bores is 100° to 140° C. The temperature of the heat transfer medium, more especially thermal oil, flowing around the bores of the die is preferably in the range from 140° to 150° C.

In another advantageous embodiment of the invention, the temperature of the cooling water into which the polaymide resin melt issues is in the range from 2° to 15° C.

In order that the same underwater granulating machine may be used for granulating both high-viscosity polyamide resins and—according to the invention—low-viscosity polyamide resins, the internal diameters of the bores of the multiple-bore die are advantageously variable.

In one particularly preferred embodiment, the bores have an internal diameter of 1.2 to 2.5 mm and a length of 12 to 50 mm. Melts of polyamide resins which have a viscosity of 800 to 3,000 mPas can thus be granulated. The inserts used, which comprise the bores, can be lengthened as required by using spacer rings behind the multiple-bore die.

Finally, in another embodiment, bores with a pressure loss of 1 to 7 bar are used.

In addition, it is of advantage in some cases—depending on the viscosity of the polyamide resin—to make the product entry into the bores of the die parallel and, in other cases, perpendicular to the longitudinal axis of the bores.

The invention is illustrated by the following Examples.

EXAMPLE 1

A polyamide resin of about 67% dimer fatty acid, 21% stearic acid, 4% HMDA (hexamethylenediamine) and 8% EDA (ethylenediamine) was prepared. The viscosity of the resin at 160° C. was 250 to 350 mPas. Its solidification point was in the range from 110° to 125° C. After leaving the reactor, the melt was cooled in a static mixer and then filtered. The bores of the multiple-bore die (length 25 mm and diameter 2.8 mm) were modified in accordance with the invention by installing 28 mm long inserts with an internal diameter of 1.4 mm. The entry temperature of the melt into the granulator was about 115° C. and the product throughput about 2,000 kg/h. Uniform cylindrical granules about 5 mm long and about 3 to 4 mm in diameter were formed. The pressure at the entrance to the granulator was 14 to 16 bar.

EXAMPLE 2

The polyamide resin "Versamid 1655" (a product of Henkel KGaA, Germany) was granulated in accordance with the invention. The molecular weight of the polyamide resin was in the range from 3,000 to 7,000. The acid value was at most 4.8 and the amine value at most 3.8. The viscosity of the resin was in the range from 250 to 350 mPas at 160° C. Its solidification point was in the range from 110° to 120° C. The granulator was operated at a pressure of 11 bar and at a rotational speed of 540 to 900 r.p.m.

The temperature of the melt before it entered the granulator was 110° to 120° C. The granules formed had a temperature of 113° to 130° C. The granulator was operated with a heat transfer oil with a temperature of 143° C. and at a water temperature of 7° to 13° C. The water throughput was 980 to 1060 liters per minute. A throughput of 1,400 to 3,200 kg/h was achieved. The granulator had four rotating blades.

The multiple-bore die of the granulator had 354 bores which originally had a length of 25 mm and a diameter of 2.8 mm. An insert with a length of 27.9 mm and an internal diameter of 1.5 mm was inserted into each of the bores. These inserts restricted flow through the bore. In addition, it was found that inserts with an internal diameter of 2.0 mm also produced good results.

EXAMPLE 3

A polyamide resin "Versamid 744" (a product of Henkel KGaA, Germany) with a molecular weight of 4,000 to 8,000 was granulated in accordance with the invention. The acid value was at most 5.9 and the amine value at most 2.8. The viscosity of the resin was in the range from 200 to 500 mPas at 160° C. Its solidification point was in the range from 120° to 130° C.

The same granulator as in Example 2 was used.

The process was carried out at a granular pressure of up to 6.9 bar and at a rotational speed of the granulator of 900 to 1,080 r.p.m. The temperature of the melt before it entered and the granulator was 113° to 127° C. The granules obtained had a temperature of 116° to 132° C. The granulator was operated with a heat transfer oil which had a temperature of 150° C. The water temperature was 2° to 7° C. and the water throughput 980 to 1,060 liters per minute. The throughput of product was 1,400 to 2,700 kg/h.

The temperature of the melt mentioned in Examples 1 and 2 relates to the polyamide resin after leaving the cooler and before entering the underwater granulator.

What is claimed is:

1. A process for granulating a polyamide resin comprising:
   (a) providing an underwater granulating device having a heated multiple-bore die wherein the bores have an internal diameter ranging from 1.2 to 2.5 mm and a length of from 12 to 50 mm;
   (b) providing a polyamide resin melt having a viscosity, at 160° C., of less than 3,000 mPas;
   (c) cooling the polyamide resin melt to form a cooled polyamide resin;
   (d) introducing the cooled polyamide resin into and through the heated multiple-bore die to form an extrudate;
   (e) providing a source of cooling water;
   (f) contacting the extrudate with the water to form a cooled extrudate; and
   (g) cutting the cooled extrudate into granules.

2. The process of claim 1 wherein the polyamide resin melt is cooled to a temperature of from 5° to 10° C. above its solidification point.

3. The process of claim 1 wherein the polyamide resin melt is cooled to a temperature below its solidification point.

4. The process of claim 1 wherein the polyamide resin has a molecular weight of from 2,000 to 10,000 g/mol.

5. The process of claim 1 wherein the cooled polyamide resin is filtered in order to remove any solidified particles present therein, prior to its introduction into the heated multiple-bore die.

6. The process of claim 1 wherein the cooled polaymide resin has a temperature of from 100° to 140° C.

7. The process of claim 1 wherein the multiple-bore die is heated by circulating a heat transfer medium having a temperature of from 140° to 150° C. around each bore of the die.

8. The process of claim 1 wherein the internal diameter of the bores is variable.

9. The process of claim 1 wherein the bores have a pressure loss of from 1 to 7 bar.

10. The process of claim 1 wherein the cooled polaymide resin is introduced into the heated multiple-bore die in a direction parallel to a longitudinal axis of rotation of the bores.

11. The process of claim 1 wherein the cooled polaymide resin is introduced into the heated multiple-bore die in a direction transverse to a longitudinal axis of rotation of the bores.

12. The process of claim 1 wherein the cooling water has a temperature of from 2° to 15° C.

* * * * *